(12) United States Patent
Christ et al.

(10) Patent No.: US 10,494,508 B2
(45) Date of Patent: *Dec. 3, 2019

(54) METHOD FOR PRODUCING A MOLDED PART FROM A CARBON MATERIAL USING RECYCLED CARBON FIBERS AND MOLDED PART

(71) Applicant: SHOWA DENKO CARBON GERMANY GMBH, Meitingen (DE)

(72) Inventors: Martin Christ, Augsburg (DE); Oswin Oettinger, Meitingen (DE); Reiner Bode, Aindling (DE); Alain Prefontaine, Wiesbaden (DE); Georg Schwaiger, Nandlstadt (DE)

(73) Assignee: Showa Denko Carbon Germany GmbH, Meitingen (DE)

( * ) Notice: Subject to any disclaimer, the term of this patent is extended or adjusted under 35 U.S.C. 154(b) by 263 days.

This patent is subject to a terminal disclaimer.

(21) Appl. No.: 15/142,803

(22) Filed: Apr. 29, 2016

(65) Prior Publication Data

US 2016/0237248 A1 Aug. 18, 2016

Related U.S. Application Data

(60) Division of application No. 13/571,635, filed on Aug. 10, 2012, now Pat. No. 9,352,967, which is a continuation of application No. PCT/EP2011/051893, filed on Feb. 9, 2011.

(30) Foreign Application Priority Data

Feb. 10, 2010 (DE) .................. 10 2010 001 787

(51) Int. Cl.
| | | |
|---|---|---|
| *C08K 7/06* | (2006.01) | |
| *C04B 35/52* | (2006.01) | |
| *C04B 35/532* | (2006.01) | |
| *C04B 35/622* | (2006.01) | |
| *C04B 35/83* | (2006.01) | |
| *D01F 9/14* | (2006.01) | |
| *H05B 7/085* | (2006.01) | |
| *C01B 32/184* | (2017.01) | |

(52) U.S. Cl.
CPC .......... *C08K 7/06* (2013.01); *C01B 32/184* (2017.08); *C04B 35/522* (2013.01); *C04B 35/532* (2013.01); *C04B 35/62204* (2013.01); *C04B 35/83* (2013.01); *D01F 9/14* (2013.01); *H05B 7/085* (2013.01); *C04B 2235/526* (2013.01); *C04B 2235/6021* (2013.01); *C04B 2235/616* (2013.01); *C04B 2235/94* (2013.01); *C04B 2235/95* (2013.01); *C04B 2235/9607* (2013.01)

(58) Field of Classification Search
None
See application file for complete search history.

(56) References Cited

U.S. PATENT DOCUMENTS

| 3,943,213 | A | * | 3/1976 | Whittaker | ............... | C04B 35/83 |
|---|---|---|---|---|---|---|
| | | | | | | 423/448 |
| 6,299,810 | B1 | | 10/2001 | Blackinton, Jr. | | |
| 2005/0242477 | A1 | | 11/2005 | Haun | | |
| 2009/0226712 | A1 | | 9/2009 | Handa et al. | | |
| 2011/0045273 | A1 | | 2/2011 | Handa et al. | | |
| 2012/0156466 | A1 | | 6/2012 | Bell et al. | | |
| 2013/0087552 | A1 | | 4/2013 | Lee et al. | | |
| 2014/0009447 | A1 | | 1/2014 | Kim | | |

FOREIGN PATENT DOCUMENTS

| DE | 3802670 A1 | 8/1989 |
|---|---|---|
| DE | 4325775 A1 | 2/1995 |
| EP | 0636428 A1 | 2/1995 |
| EP | 0720973 A2 | 7/1996 |
| EP | 1950253 A1 | 7/2008 |
| JP | H1150338 A | 2/1992 |
| JP | H0699160 B2 | 12/1994 |
| JP | 2000219780 A | 8/2000 |
| JP | 2003033915 A | 2/2003 |
| WO | 2011007184 A2 | 1/2011 |

* cited by examiner

Primary Examiner — Guinever S Gregorio
(74) Attorney, Agent, or Firm — Laurence A. Greenberg; Werner H. Stemer; Ralph E. Locher

(57) ABSTRACT

A method produces a molded part from carbon containing carbon fibers in an amount of less than 20% by weight. The method includes comminuting waste parts or scrap parts formed from a carbon fiber-reinforced synthetic material, a carbon fiber reinforced carbon or a carbon fiber reinforced concrete. A mixture is produced from the comminuted product, a binder such as pitch, a carbon material such as coke and optionally one or more additives, wherein the mixture contains less than 20% by weight of fibers. The mixture is molded into a molded part and the molded part is carbonized. Optionally, the molded carbonized part is impregnated with an impregnating agent. Finally and optionally, the molded carbonized part or the molded part impregnated part is graphitized.

21 Claims, No Drawings

METHOD FOR PRODUCING A MOLDED PART FROM A CARBON MATERIAL USING RECYCLED CARBON FIBERS AND MOLDED PART

CROSS-REFERENCE TO RELATED APPLICATION

This is a divisional application of application Ser. No. 13/571,635, filed Aug. 10, 2012; which was a continuing application, under 35 U.S.C. § 120, of International application PCT/EP2011/051893, filed Feb. 9, 2011; the application also claims the priority, under 35 U.S.C. § 119, of German patent application No. DE 10 2010 001 787.6, filed Feb. 10, 2010; the prior applications are herewith incorporated by reference in their entirety.

BACKGROUND OF THE INVENTION

Field of the Invention

The present invention relates to a method for the production of a molded part formed from carbon, in particular, graphite, containing carbon fibers in an amount of less than 20% by weight, using recycled carbon fibers.

Carbon-based, in particular graphite-based, molded parts are used in many technical fields. Such molded parts, for example graphite electrodes, are used, inter alia, in electrothermal processes and in particular in the production of steel in electric arc furnaces for liquefying a charge for smelting, because of the good heat conductivity, low electrical resistance and chemical resistance of graphite. A further example of such a molded part is a graphite-based connecting piece, which is also known as a graphite nipple, and is used to connect the front faces of graphite electrodes to form strings of electrodes. Such connecting pieces are usually shaped as a double truncated cone or are in the shape of a bicone or cylinder and have an external thread via which they are screwed into thread housings with complementary internal threads on the front face of the graphite electrodes in order to connect two electrodes together via their front faces. When operating an arc furnace, an electrical voltage is applied to the electrode string, and as a result an arc is produced from the lower end of the electrode string down to the charge for smelting, producing temperatures that are sufficiently high, for example 1500° C., to melt the charge for smelting, for example steel scrap or sponge iron; this severely loads the electrode string mechanically, thermally and electrically.

In order to increase the strength and thermal shock resistance of graphite electrodes and graphite connecting pieces in particular and carbon-based components in general and to reduce the thermal expansion coefficient thereof, it has been proposed that carbon fibers should be added to these materials. Such carbon fibers are produced, for example, from carbon-containing starting materials, for example polyacrylonitrile, first by spinning fibers that are then carbonized and optionally graphitized under tension before the fibers so produced are then surface treated and optionally coated with sizing. It is important, however, in many components formed from carbon-based materials in general and especially graphite, such as graphite electrodes and graphite connecting pieces, which the maximum amount of carbon fibers in the material is 20% by weight, so that the properties of the final product are, as desired, principally determined by the properties of the carbon or graphite matrix. In addition, it is vital with graphite electrodes and graphite connecting pieces that the fibers are firmly bound to the matrix material, as otherwise the pertinent technical properties of the graphite electrodes and graphite connecting pieces would be compromised.

Published, European patent application EP 1 460 883 A2 (corresponding to U.S. patent publication No. 2004/026559, for example, describes connecting pieces for electrodes that are composed of graphite containing 0.2% to 10% by weight of carbon fibers, wherein the surfaces of the carbon fibers are oxidatively activated and in addition, the carbon fibers have a carbonized coating. In order to produce such connecting pieces, the surfaces of the carbon fibers are initially activated by oxidation and then coated with a coating medium preferably selected from wax, pitch, natural resins or thermoplastic or thermoset polymers, before the fibers obtained are mixed with coke, pitch and possibly additives and the mixture obtained is molded into a green part which is then carbonized and finally graphitized.

Furthermore, the production of carbon fibers is very expensive and energy-intensive, and so the material costs for carbon fibers are substantially higher than the costs of the raw materials used for the manufacture of the carbon matrix or graphite matrix. As a result, the availability of an appropriate production method that was simple and inexpensive to carry out would be advantageous.

SUMMARY OF THE INVENTION

Thus, the present invention aims to provide a method for the production of a molded part formed from carbon, in particular graphite, containing less than 20% by weight of carbon fibers, which is simple and in particular inexpensive to carry out and which can be used in particular to produce graphite electrodes and graphite connecting pieces with excellent properties.

In accordance with the invention, this aim is accomplished by a method for the production of a molded part formed from carbon containing a quantity of less than 20% by weight of carbon fibers, which contains the following steps:
a) comminuting waste parts or scrap parts formed from a carbon fiber-reinforced composite material;
b) producing a mixture from the comminuted product obtained in step a), a binder, a carbon material and optionally at least one additive, wherein the mixture contains less than 20% by weight of fibers;
c) molding the mixture obtained in step b) into a molded part; and
d) carbonizing the molded part obtained in step c).

This solution is based on the surprising observation that a method in which waste parts or scrap parts formed from a carbon fiber reinforced composite material are comminuted and the comminuted product is used as the fibrous raw material mixed with the components required to form a matrix of a carbon composite material, namely binder, carbon material and optionally one or more additive(s), and in which this mixture is shaped into a molded part and then carbonized and optionally graphitized, can be used to produce molded parts, for example graphite electrodes and graphite connecting pieces for graphite electrodes, formed from carbon containing a quantity of less than 20% by weight of carbon fibers, in a simple manner, that have superb properties, in particular superb strength, a low thermal expansion coefficient and excellent thermal shock resistance. In this regard it is particularly surprising that this method can be used to obtain molded parts formed from carbon fiber reinforced carbon or graphite in which the carbon fibers are firmly fixed in the carbon matrix material. This solid hold of the carbon fibers on the carbon matrix material means that the thermal expansion coefficient of the molded part is reduced and the strength and the temperature shock resistance of the molded parts are increased. Since the method dispenses with the use of newly produced carbon fibers, but instead uses old carbon fibers from comminuted waste parts or scrap parts from a carbon fiber reinforced composite material, the method is also much cheaper than the known prior art methods for the production of corresponding molded parts. Furthermore, the method of the invention not only concerns a method for the production of a molded part formed from carbon containing a quantity of less than 20% by weight of carbon fibers, but in particular it also concerns a method for recycling waste parts or scrap parts from a carbon fiber reinforced composite material.

The term "carbon material" as used in the present invention in the context of step b) of the method of the invention means any material containing a large quantity of carbon, in particular a material that is at least 70% by weight, particularly preferably at least 80% by weight and most preferably at least 90% by weight constituted by carbon. A preferred example of such a carbon material is coke.

Primarily, waste parts or scrap parts from any carbon fiber reinforced composite material can be used in step a) of the method of the invention, i.e. a material in which carbon fibers are embedded in a matrix. Good results are obtained in particular when in step a) of the method, waste parts or scrap parts are used that are composed of a carbon fiber reinforced synthetic material (CFM), a carbon fiber reinforced carbon (CFC), a carbon fiber reinforced concrete or a mixture of two or more of the composite materials cited above. Examples of suitable matrix materials for CFMs are any type of thermoplastic or thermoset synthetic resins, such as phenolic resin or epoxy resin.

Preferably, the carbon fiber reinforced composite material contained in the waste parts or scrap parts used in step a) of the method contain at least 20% by volume of carbon fibers, particularly preferably 30% to 70% by volume of carbon fibers and particularly preferably 40% to 60% by volume of carbon fibers. This embodiment is particularly preferred when the waste parts or scrap parts are composed of CFM or CFC. The more carbon fibers in the composite material of the waste parts or scrap parts used, the less matrix material from the comminuted product is introduced into step b) and it might be possible to dispense with separating the matrix material out of the comminuted product prior to carrying out step b) of the method.

When the waste parts or scrap parts are composed of carbon fiber reinforced concrete, the typical carbon fiber content is less than 10% by volume.

In step a) of the method, waste parts or scrap parts can in particular be used that are formed from a carbon fiber reinforced composite material that contains long fibers and/or staple fibers as the carbon fibers.

Any apparatus known to the skilled person that can comminute carbon fiber reinforced composite materials can be used to comminute the waste parts or scrap parts in step a) of the method. Non-limiting examples in this regard are shredders, cutting mills, impact mills and hammer mills.

After comminution, sizing is preferably applied to the comminuted goods or recycled fibers; any of the materials known to the skilled person for this purpose may be used.

In step b) of the method, to achieve good mixing with the binder, the carbon material and any additives, the waste parts or scrap parts from the carbon fiber reinforced composite material in step a) of the method are principally comminuted to particles with a length in the range 1 to 100 mm. In this context, "principally" means that the length of more than 50% by weight, preferably at least 75% by weight, particularly preferably at least 90% by weight and more particularly preferably at least 95% by weight of the particles is in the range 1 to 100 mm after comminution. The individual particles may have any geometric form. As an example, they may be in the form of flakes, for example with a rectangular cross section, or they may be cylindrical or fibrous in shape.

In addition, in a further development of the inventive concept, it is proposed that step a) of the invention be carried out such that, in addition to the comminuted particles, the comminuted product contains only a relatively small quantity of dust. To this end, dust can be screened out of the product during or after comminution. The term "dust" as used in this context means particles with a mean particle size of less than 100 μm. Preferably, the comminution of step a) of the method is carried out such that after comminution, the product contains less than 5% by weight of dust particles with a mean particle size of less than 100 μm; as a rule, this can only be achieved by screening.

In a further preferred embodiment of the present invention, in step a) of the method, both components of the composite material of which the waste parts or scrap parts are composed, i.e. the matrix and the carbon fibers, are released from each other, during or after comminution. The term "release" means detaching the fibers from the matrix.

In this embodiment, the matrix may be released from the carbon fibers by contacting the waste parts or scrap parts with an acid, for example a mineral acid, such as sulfuric acid or nitric acid, with a caustic substance, for example sodium hydroxide, or with a solvent. Alternatively, the matrix can be automatically released from the matrix upon comminution. The two components (carbon fibers and matrix material) can then be added to step b) of the method together.

Alternatively, in step a) of the method, during or, as is preferable, after comminution of the waste parts or scrap parts, the matrix material can be separated from the carbon fibers of the composite material, i.e. the matrix material can be removed from the carbon fibers so that only the carbon fibers produced in step a) of the method are supplied to step b) of the method. This naturally requires prior or simultaneous fiber-matrix detachment. Separating the matrix from the carbon fibers can, for example, be carried out by screening or sifting; sifting is preferably carried out in a rotary sifter, a pneumatic sifter or a zigzag sifter.

In principle, in step b) of the method, any compounds that are familiar to the skilled person can be used as the binder. Good results are in particular obtained when the binder is selected from the group consisting of phenolic resins, pitches, furan resins, phenyl esters and any mixtures of two or more of said compounds; particularly preferably, pitch is used as the binder.

In addition, in a further development of the inventive concept, in step b) of the method, coke is used as the carbon material; pitch coke, metallurgical coke or petcoke, in particular needle coke, are particularly preferred. Preferably, the coke employed has a particle size of less than 30 mm, particularly preferably less than 15 mm and more particularly preferably in the range 0.01 to 3 mm.

In a particularly preferred embodiment of the present invention, pitch is used as the binder and coke is used as the carbon material in step b) of the method.

The mixing ratio of coke to binder is preferably adjusted to between 5:1 and 2:1, for example approximately 4:1.

Optionally, any additive that is familiar to the person of average skill in the art can be added to this mixture; an example is 0.1% to 0.5% by weight of iron oxide.

According to the invention, the (carbon) fiber content of the mixture in step b) of the method is adjusted to less than 20% by weight, wherein the (carbon) fiber content of the mixture is preferably less than 15% by weight, particularly preferably less than 10% by weight, more particularly preferably less than 5% by weight and highly preferably less than 3% by weight. The fiber content set in step b) of the method is smaller than or the same as the fiber content of the end product, since after step b) of the method, no more (carbon) fibers are added to the mixture, but the mass of the matrix components might fall due to the subsequent heat treatments such as carbonizing and/or graphitizing.

In step c) of the method, the mixture produced in step b) of the method is shaped using any method known to the skilled person for this purpose, for example by extrusion, into a molded body with the desired geometry and the desired dimensions.

Preferably, the carbonizing of step d) of the method is carried out at a temperature in the range 600° C. to 1200° C.

After carbonizing, the carbonized molded part may optionally be graphitized, as is preferable. When such graphitizing is carried out, between step d) of the method and graphitizing, the shaped body is preferably impregnated with an impregnating agent, preferably impregnation pitch. In this respect, several impregnation steps may be carried out, wherein between two respective impregnation steps, a carbonizing step is preferably carried out.

In addition, in a further development of the inventive concept, it is proposed that the optional graphitizing step be carried out at a temperature in the range 1800° C. to 3000° C., particularly preferably in the range 2300° C. to 2700° C.

In accordance with a further preferred embodiment, prior to being supplied to step b) of the method, the waste parts or scrap parts comminuted in step a) of the method during which, as described above, the carbon fibers have optionally been released from the matrix material or the matrix material has been separated from the carbon fibers, an oxidative treatment is carried out in order to oxidize the fiber surface or the fiber bundle surface. This produces functional acid-containing groups on the fiber surface, such as carboxyl groups and/or hydroxyl groups, or other activated groups such as C-H-acid groups activated by carbonyl groups, basic, pyrone-type surface groups or the like, whereby the fiber-matrix hold is increased and thus the strength of the shaped body is improved.

To this end, the oxidative treatment may, for example, contain oxidation in an aqueous bath containing oxidizing agent, anodic oxidation in an aqueous bath containing electrolyte and/or oxidation in a gas stream containing an oxidizing agent, for example at 400° C. to 600° C. Any routine oxidizing agent may be used as the oxidizing agent, such as alkali (earth) metal salts, for example alkali (earth) metal nitrates, sulfates, chlorates, bromates or iodates, or oxidizing acids for example nitric acid, sulfuric acid, chloric acid, bromic acid or iodic acid. To remove the oxidizing agent, prior to being supplied to step b) of the method, the oxidatively treated product may be washed with deionized water.

Depending on the composition of the carbon fiber reinforced composite material from which the waste parts or scrap parts used in step a) of the method are composed, it may be preferable to carbonize the waste parts or scrap parts prior to carrying out step a) of the method or after comminution in step a) of the method, but before step b) of the method. This embodiment is particularly preferable when the waste parts or scrap parts consist of CFM, in order to transform the matrix material of the composite material into carbon.

After comminution, sizing is preferably applied to the comminuted, carbonized material or the recycled fibers.

In accordance with a particularly preferred embodiment of the present invention, the method of the invention contains the following steps:
a) comminuting waste parts or scrap parts formed from a carbon fiber-reinforced carbon (CFC) and optionally, oxidizing the comminuted product;
b) producing a mixture from the comminuted product obtained in step a), pitch, coke and optionally one or more additives, wherein the mixture contains less than 20% by weight of fibers;
c) molding the mixture obtained in step b) into a molded part;
d) carbonizing the molded part obtained in step c);
e) optionally, impregnating the molded part carbonized in step d) with an impregnating agent; and
f) optionally, graphitizing the molded part carbonized in step d) or the molded part impregnated in step e).

The waste parts or scrap parts formed from carbon fiber reinforced composite material used in step a) of the method preferably contain at least 20% by volume of carbon fibers, particularly preferably 30% to 70% by volume of carbon fibers and particularly preferably 40% to 60% by volume of carbon fibers.

After comminuting and before supplying the comminuted product to step b) of the method, fiber-matrix detachment may be carried out and the matrix material may be separated from the carbon fibers so that the product from step a) of the method supplied to step b) of the method is solely the carbon fibers. If an oxidative treatment of the products is carried out, the optional separation is preferably carried out before the oxidative treatment.

In addition, in this embodiment, after step d) of the method, an impregnation and a graphitizing step in accordance with steps e) and f) of the method are preferably carried out. To this end, steps d) and e) of the method are carried out several times one after the other in alternation before the graphitizing step is carried out.

In accordance with a second particularly preferred embodiment of the present invention, the method of the invention contains the following steps:
a) comminuting waste parts or scrap parts formed from a carbon fiber-reinforced carbon (CFM) and optionally, oxidizing the comminuted product;
b) producing a mixture from the comminuted product obtained in step a), pitch, coke and optionally one or more additives, wherein the mixture contains less than 20% by weight of fibers;
c) molding the mixture obtained in step b) into a molded part;
d) carbonizing the molded part obtained in step c);
e) optionally, impregnating the molded part carbonized in step d) with an impregnating agent; and
f) optionally, graphitizing the molded part carbonized in step d) or the molded part impregnated in step e).

In this embodiment, the waste parts or scrap parts formed from CFM prior to comminuting in accordance with step a) are carbonized, or the comminuted product of step a) of the method is carbonized prior to the optional oxidation before the product obtained is supplied to step b) of the method.

In this embodiment too, after comminution and before supplying the comminuted product to step b) of the method, fiber-matrix detachment may be carried out and the matrix material may be separated from the carbon fibers so that only the carbon fibers are supplied to step b) of the method as the product from step a) of the method. If an oxidative treatment of the product is carried out, the separation is preferably carried out prior to the oxidative treatment, wherein the optional carbonizing is also preferably carried out before the oxidative treatment but after separation.

In addition, in this embodiment as well, after step d) of the method, impregnation and graphitizing in accordance with steps e) and f) are preferably carried out. Steps d) and e) of the method may be carried out several times one after the other in alternation before the graphitizing step is carried out.

Finally, in this embodiment as well, the waste parts or scrap parts formed from carbon fiber reinforced composite material used in step a) of the invention preferably contain at least 20% by volume of carbon fibers, particularly preferably 30% to 70% by volume of carbon fibers and particularly preferably 40% to 60% by volume of carbon fibers.

In accordance with a third particularly preferred embodiment of the present invention, the method of the invention contains the following steps:
a) comminuting waste parts or scrap parts formed from a carbon fiber-reinforced concrete and separating the matrix from the carbon fibers, preferably by screening or sifting;
b) producing a mixture from the comminuted carbon fibers obtained in step a), pitch, coke and optionally one or more additives, wherein the mixture contains less than 20% by weight of fibers;
c) molding the mixture obtained in step b) into a molded part;
d) carbonizing the molded part obtained in step c);
e) optionally, impregnating the molded part carbonized in step d) with an impregnating agent; and
f) optionally, graphitizing the molded part carbonized in step d) or the molded part impregnated in step e).

Since in this embodiment the matrix material is necessarily separated from the carbon fibers before the carbon fibers are supplied to step b) of the method, in this embodiment no carbonizing step is carried out prior to step d) of the method, i.e. in particular no carbonizing of the waste parts or scrap parts before comminution in accordance with step a) of the method and in particular no carbonizing of the product comminuted in accordance with step a) of the method.

Preferably, in addition in this embodiment, no oxidative treatment of the comminuted product is carried out.

Furthermore, in this embodiment as well, after step d) of the method, an impregnation and a graphitizing step in accordance with steps e) and f) of the method are carried out. In this regard, steps d) and e) of the method may be carried out several times one after the other in alternation before the graphitizing step is carried out.

The method of the invention is of particular application to the production of graphite electrodes, graphite connecting pieces for graphite electrodes, cathodes for aluminum electrolytic cells, blast furnace linings and molded parts formed from fine grain graphite. In this context, the term "fine grain graphite" means graphite with a particle size of less than 1 mm.

The present invention also proposes a molded part and in particular a graphite electrode, a graphite connecting piece, a cathode for aluminum electrolytic cells, a blast furnace lining or a molded part formed from fine grain graphite obtainable by the method of the invention described hereinabove.

Other features which are considered as characteristic for the invention are set forth in the appended claims.

Although the invention is described herein as embodied in a method for producing a molded part from a carbon material using recycled carbon fibers, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE INVENTION

We now turn to example 1 where 5 mm thick CFM plates with an epoxy resin matrix and a fiber content of 50% by volume were comminuted in a shredder and then milled in a cutting mill. A screen with round holes (10 mm diameter) prevented particles with larger dimensions from leaving the milling chamber of the cutting mill.

The milled material was free-flowing and had a dust content of approximately 15% by weight.

We now turn to example 2 where 3 mm thick CFM plates with an epoxy resin matrix and a fiber content of approximately 50% by volume were comminuted in a shredder and then milled in a cutting mill. A screen with long holes (dimensions 3 mm×50 mm) prevented particles with larger dimensions from leaving the milling chamber of the cutting mill.

The milled goods were free-flowing and had a dust content of approximately 20% by weight.

We now turn to example 3 where portions of the recycled fibers produced in example 1 and in example 2 were carbonized for 20 hours at 900° C. in a nitrogen atmosphere. The loss of mass due to the heat treatment was determined to be approximately 40% by weighing before and after carbonizing.

The free-flowing nature of the materials was improved by carbonizing.

We now turn to examples 4 to 7 and comparative examples 1 and 2 where 100 parts of needle coke (particle size<1.2 mm), 27 parts of coal tar pitch and 3 parts of respectively one of the recycled fibers produced in examples 1 to 3 were used to make respective base stocks of molding masses. The mixtures were extruded into rods with a diameter of 20 mm and a length of 110 mm, carbonized at 800° C. and graphitized at 2800° C.

Further, reference samples without fibers or with 3 parts staple fibers (Sigrafil C25S066 PUT, SGL Technologies GmbH) with a fiber length of 6 mm, were produced.

The linear thermal expansion coefficient in the extrusion direction (CTE) was determined for all of the samples. The results are summarized in Table 1 below.

TABLE 1

| Example no | Composition | CTE [μm/m · K] |
|---|---|---|
| Comparative Example 1 | Reference, no fibers | 0.22 |
| Comparative Example 2 | Reference with Sigrafil C25S066 PUT staple fibers | 0.17 |

TABLE 1-continued

| Example no | Composition | CTE [μm/m · K] |
|---|---|---|
| Example 4 | Molding mass with recycled fibers from Example 1 (10 mm diameter screen) | 0.17 |
| Example 5 | Molding mass with recycled fibers from Example 3 (10 mm diameter screen, carbonized) | 0.17 |
| Example 6 | Molding mass with recycled fibers from Example 2 (3 × 50 mm screen) | 0.20 |
| Example 7 | Molding mass with recycled fibers from Example 3 (3 × 50 mm screen, carbonized) | 0.20 |

The present results show that both the molding mass of comparative example 2, which contained the freshly produced staple fibers, and also the molding mass of examples 4 to 7, which contained recycled fibers, compared with the molding mass of comparative example 1, which contained no fibers, had lower CTE values, and so the CTE had been reduced. No difference was observed between carbonized and non-carbonized recycled fibers.

The invention claimed is:

1. A method for manufacturing a molded part, which comprises the following steps of:
   a) comminuting parts selected from the group consisting of waste parts formed from a carbon fiber-reinforced composite material or scrap parts formed from a carbon fiber-reinforced composite material resulting in a comminuted product;
   b) producing a mixture from the comminuted product, a binder, and a carbon material, wherein the mixture contains less than 20% by weight of carbon fibers;
   c) molding the mixture into the molded part, the mold part being selected from the group consisting of a graphite electrode, a graphite connecting piece for graphite electrodes, a cathode for aluminum electrolytic cells, a blast furnace lining and a molded part formed from fine grain graphite; and
   d) carbonizing the molded part and after the carbonizing step the molded part containing a quantity of less than 20 % by weight of the carbon fibers.

2. The method according to claim 1, which further comprises selecting the parts from the group consisting of a carbon fiber reinforced synthetic material, a carbon fiber reinforced carbon, a carbon fiber reinforced concrete and a mixture of at least two of the above-identified materials.

3. The method according to claim 2, which further comprises carrying out the step of comminuting the parts in one of a shredder, a cutting mill, an impact mill or a hammer mill.

4. The method according to claim 1, which further comprises:
   comminuting the parts of the carbon fiber reinforced composite material in step a) to particles with a length in a range 1 to 100 mm; and
   screening dust out of the comminuted product so that the comminuted product of step a) has less than 5% by weight of dust particles with a mean particle size of less than 100 μm during or after the comminuting step.

5. The method according to claim 1, which further comprises separating a matrix from the carbon fibers of the carbon fiber-reinforced composite material before or after the comminuting step, wherein separation of the matrix from the carbon fibers is carried out by screening or sifting.

6. The method according to claim 5, which further comprises carrying out the sifting with a shifter selected from the group consisting of a rotary sifter, a pneumatic sifter and a zigzag sifter.

7. The method according to claim 1, which further comprises:
   selecting the binder from a compound selected from the group consisting of phenolic resins, pitches, furan resins, phenyl esters and any mixture of at least two of the above identified compounds; and
   selecting the carbon material from the group consisting of coke, pitch coke, metallurgical coke, petcoke, and needle coke, and a ratio in the mixture between the carbon material and the binder is in a range 5:1 to 2:1.

8. The method according to claim 7, which further comprises setting the ratio in the mixture between the carbon material and the binder to be 4:1.

9. The method according to claim 1, which further comprises adjusting a fiber content of the mixture to be less than 15% by weight.

10. The method according to claim 1, which further comprises:
    impregnating the molded part with an impregnating agent; and
    graphitizing the molded part, wherein the graphitizing is carried out at a temperature in a range 1800° C. to 3000° C.

11. The method according to claim 10, which further comprises:
    impregnating the molded part with impregnating pitch as the impregnating agent; and
    carrying out the graphitizing in a range of 2300° C. to 2700° C.

12. The method according to claim 1, which further comprises carbonizing the parts formed from carbon fiber-reinforced composite material before carrying out step a).

13. The method according to claim 1, which further comprises providing the mixture with at least one additive.

14. The method according to claim 1, which further comprises adjusting a fiber content of the mixture to be less than 10% by weight.

15. The method according to claim 1, which further comprises adjusting a fiber content of the mixture to less be than 5% by weight.

16. The method according to claim 1, which further comprises adjusting a fiber content of the mixture to be less than 3% by weight.

17. The method according to claim 1, which further comprises carbonizing the parts formed from carbon fiber-reinforced composite material after the comminuting step a) but before step b).

18. A method for manufacturing a molded part, which comprises the following steps of:
    a) comminuting parts selected from the group consisting of waste parts formed from a carbon fiber-reinforced carbon and scrap parts formed from a carbon fiber-reinforced carbon resulting in comminuted product and oxidizing the comminuted product;
    b) producing a mixture from the comminuted product obtained in step a), pitch, coke and at least one additive, wherein the mixture contains less than 20% by weight of carbon fibers;
    c) molding the mixture obtained in step b) into the molded part, the mold part being selected from the group consisting of a graphite electrode, a graphite connecting piece for graphite electrodes, a cathode for aluminum electrolytic cells, a blast furnace lining and a molded part formed from fine grain graphite;

d) carbonizing the molded part obtained in step c);

e) impregnating the molded part carbonized in step d) with an impregnating agent; and f) graphitizing the molded part impregnated in step e) and after the graphitizing step the molded part containing a quantity of less than 20% by weight of the carbon fibers.

19. A method for manufacturing a molded part, which comprises the following steps of:

a) comminuting parts selected from the group consisting of waste parts formed from a carbon fiber-reinforced carbon and scrap parts formed from a carbon fiber-reinforced carbon resulting in a comminuted product and, oxidizing the comminuted product;

b) producing a mixture from the comminuted product, pitch, coke and at least one additive, wherein the mixture contains less than 20% by weight of carbon fibers;

c) molding the mixture into the molded part, the mold part being selected from the group consisting of a graphite electrode, a graphite connecting piece for graphite electrodes, a cathode for aluminum electrolytic cells, a blast furnace lining and a molded part formed from fine grain graphite;

d) carbonizing the molded part;

e) impregnating the molded part carbonized with an impregnating agent; and f) graphitizing the molded part, the parts formed from a carbon fiber reinforced synthetic material are carbonized prior to comminution in accordance with step a) or the product comminuted in accordance with step a) is carbonized prior to the oxidation, before the product obtained thereby is supplied to step b) and after the graphitizing step the molded part containing a quantity of less than 20% by weight of the carbon fibers.

20. A method for manufacturing a molded part, which comprises the following steps of:

a) comminuting parts selected from the group consisting of waste parts formed from a carbon fiber-reinforced concrete and scrap parts formed from a carbon fiber-reinforced concrete, and separating a matrix from the carbon fibers resulting in comminuted carbon fibers;

b) producing a mixture from the comminuted carbon fibers obtained in step a), pitch, coke and at least one additive, wherein the mixture contains less than 20% by weight of carbon fibers;

c) molding the mixture into a molded part, the mold part being selected from the group consisting of a graphite electrode, a graphite connecting piece for graphite electrodes, a cathode for aluminum electrolytic cells, a blast furnace lining and a molded part formed from fine grain graphite;

d) carbonizing the molded part;

e) impregnating the molded part with an impregnating agent; and f) graphitizing the molded part and after the graphitizing step the molded part containing a quantity of less than 20% by weight of the carbon fibers.

21. The method according to claim 20, which further comprises separating the matrix from the carbon fibers by one of screening or sifting.

* * * * *